F. H. BLANDING.
VARIABLE THROW ECCENTRIC.
APPLICATION FILED FEB. 23, 1909.
1,046,375.
Patented Dec. 3, 1912.
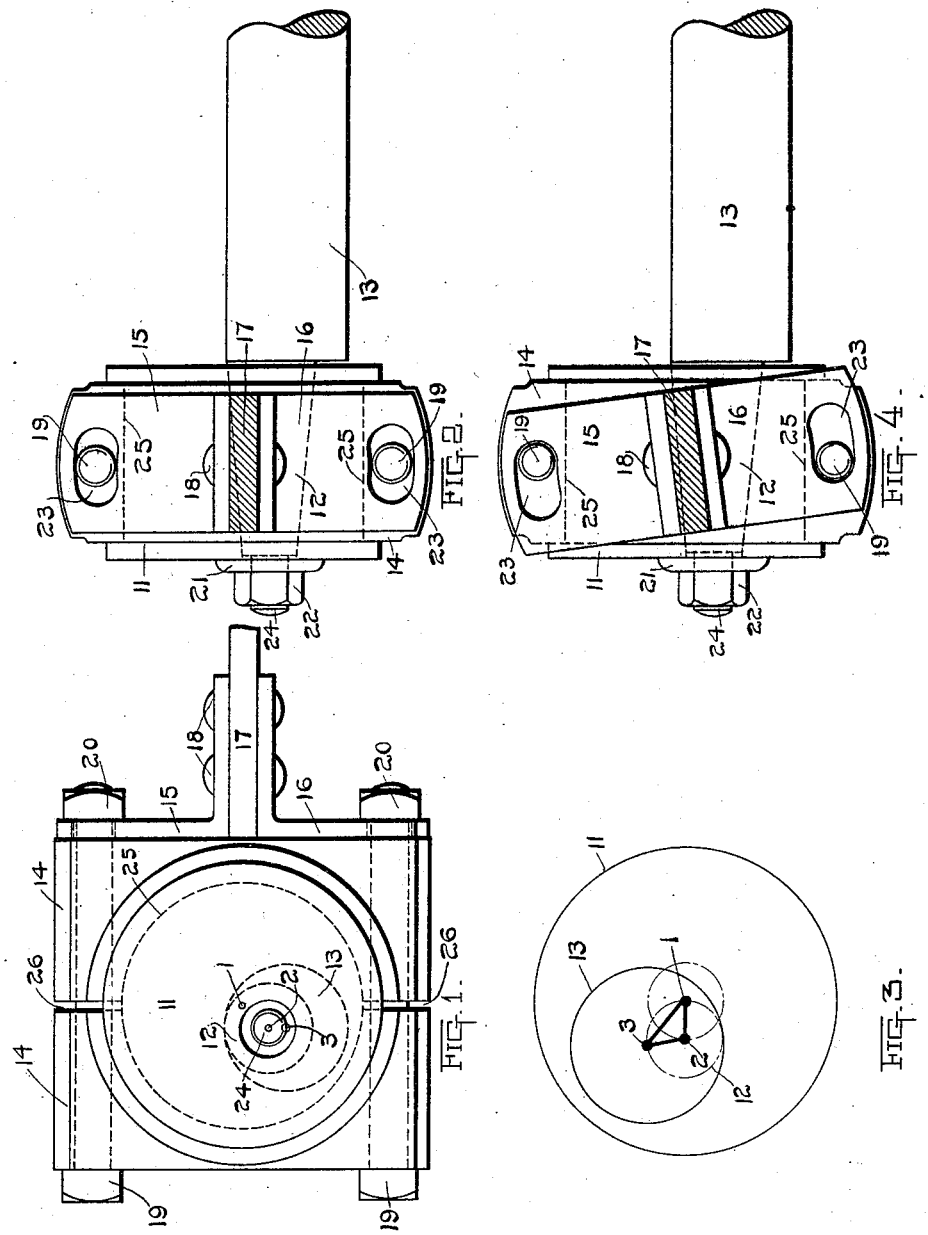

UNITED STATES PATENT OFFICE.

FORREST H. BLANDING, OF CHICAGO, ILLINOIS, ASSIGNOR TO ALLIS-CHALMERS COMPANY, OF MILWAUKEE, WISCONSIN, A CORPORATION OF NEW JERSEY.

VARIABLE-THROW ECCENTRIC.

1,046,375.   Specification of Letters Patent.   Patented Dec. 3, 1912.

Application filed February 23, 1909. Serial No. 479,559.

*To all whom it may concern:*

Be it known that I, FORREST H. BLANDING, residing at Chicago, in the county of Cook and State of Illinois, have invented a certain new and useful Improvement in Variable-Throw Eccentrics, of which the following is a specification.

This invention relates to improvements in the construction of variable throw eccentrics.

The object of the invention is to produce an eccentric which is applicable as a driving gear in any machine where a moderately rapid changing of the throw is desirable, and in which the alinement between the driving and the driven members is also a variable. Such gears are well adapted to variable throw vanner frames, in which case the driving amount of motion and the inclination of the driven member are variables which depend upon the class of material under treatment.

A clear conception of the invention can be obtained by referring to the accompanying drawings in which like reference characters denote the same parts in different views.

Figure 1 is a side view of an eccentric built according to the invention and shows the connection to a fragment of the driven member. Fig. 2 is an end view of the device shown in Fig. 1, and shows the connection to a fragment of the driving shaft. Fig. 3 is a diagrammatic view of the variable eccentric centers. Fig. 4 is a view of the eccentric similar to that shown in Fig. 2, but having the driven member tilted at an angle.

The driving shaft 13, having the round tapered eccentric projection 12, is connected in any suitable manner, not shown, to a source of power, see Figs. 1, 2, 4. The eccentric body 11, having a round tapered hole passing through it, receives the eccentric projection 12 of the driving shaft 13. The eccentric body 11 is clamped upon the tapered projection 12 by means of the nut 22 and the washer 21, which fit upon the threaded end 24 of the projection 12. The eccentric straps 14 which coact upon the turned surface 25 of the eccentric body 11, are held in place by bolts 19 and nuts 20. The straps 14 do not contact with each other, the space 26 between them being allowed for shims. The driven member 17 is attached to the two plates 15, 16, by any suitable means, such as rivets 18. The plates 15, 16, coact upon a surface of one of the eccentric straps 14 and have holes 23 which allow for the passage of the bolts 19, thus giving a connecting means between the strap 14 and the plates 15, 16. The holes 23, see Figs. 2, 4, are elongated.

As shown in Fig. 3, the center 3 of the driving shaft 13 is a fixed distance from the center 2 of the projection 12 upon the shaft 13. The center 2 of the projection 12 is a fixed distance from the center 1 of the body 11. On account of the shiftability of the body 11 upon the projection 12, the relative position of the center 3 to the center 1 is a variable.

In applying the invention, the nut 22 is unscrewed and the body 11 is rotated upon the projection 12 until the desired throw is obtained when the nut 22 is screwed tight up against the washer 21. The minimum throw which is obtainable is effected when the body 11 has been brought into a position such that a straight line connecting the center 3 with the center 2 will coincide with a straight line drawn from the center 2 to the center 1, both the center 3 and the center 1 being on the same side of the center 2. The maximum throw is obtained when like connections between the centers are established, the center 3 being directly opposite the center 2 from the position held by the center 1. If the relative position of the driving shaft 13 to the driven member 17 is to be changed, the nuts 20 are unscrewed and the driven member 17 is shifted, the bolts 19 moving in the slots 23 during the shifting operation. When the desired position is obtained, the nuts 20 are again screwed tight against the plates 15, 16.

It should be understood that it is not desired to be limited to the exact details of construction shown and described, for obvious modifications will occur to a person skilled in the art.

It is claimed and desired to secure by Letters Patent,—

1. In a variable throw eccentric, the combination of a driving member, an eccentric projection thereon, an eccentric adjustably and eccentrically rigidly connected to said projection, an eccentric strap on said eccentric and a driven member having a T-head formed of plates adjustably but rigidly connected with said eccentric strap said driven member being for said adjustable connection angularly shiftable on an axis at right angles to the axes of the driving member, the projection and the eccentric.

2. The combination of a driving shaft having a round tapered projection eccentric thereto, an eccentric having a round tapered hole eccentrically therethrough, said projection fitting said hole whereby any degree of angular adjustment of the eccentric on said projection may be had, means for axially clamping said eccentric on said projection in any angular adjusted position, and a strap on said eccentric.

3. The combination of a driving shaft, an eccentric thereon, and a driven member having a T-head connected to said eccentric and having connecting means making the said driven member angularly adjustable on an axis at right angles to the axis of said shaft.

4. The combination of a driving shaft, an eccentric thereon, a strap on the eccentric, a driven member connected to said eccentric by said strap and angularly adjustable on an axis at right angles to the axis of said shaft, and a bolt connecting said driven member and strap and also holding said strap on said eccentric.

In testimony whereof, I affix my signature in the presence of two witnesses.

FORREST H. BLANDING.

Witnesses:
   H. C. CASE,
   G. F. DE WEIN.

---

Copies of this patent may be obtained for five cents each, by addressing the "Commissioner of Patents, Washington, D. C."